(12) United States Patent
Xie et al.

(10) Patent No.: US 7,547,733 B2
(45) Date of Patent: Jun. 16, 2009

(54) COMPOSITE PROTON EXCHANGE MEMBRANE

(75) Inventors: Tao Xie, Troy, MI (US); Timothy J. Fuller, Pittsford, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 618 days.

(21) Appl. No.: 10/960,552

(22) Filed: Oct. 7, 2004

(65) Prior Publication Data

US 2006/0078775 A1    Apr. 13, 2006

(51) Int. Cl.
*C08J 5/22* (2006.01)
*H01M 8/10* (2006.01)

(52) U.S. Cl. .............................. 521/27; 521/28; 429/33; 429/30; 429/40

(58) Field of Classification Search ................... 521/27, 521/28; 429/33, 30, 40
See application file for complete search history.

(56) References Cited

U.S. PATENT DOCUMENTS 5,919,583 A * 7/1999 Grot et al. ...................... 429/33
2002/0068677 A1 * 6/2002 Crosbie ........................ 501/32

FOREIGN PATENT DOCUMENTS

WO    WO 02103834 A1 * 12/2002

* cited by examiner

*Primary Examiner*—David Wu
*Assistant Examiner*—Michael M Bernshteyn

(57) ABSTRACT

An organic/inorganic composite proton exchange membrane (PEM) is disclosed. The PEM includes a proton exchange membrane and a particulate inorganic conductor filler material provided in the proton exchange membrane. The particulate inorganic conductor filler material imparts enhanced water retention capabilities to the PEM at high temperatures, as well as enhances the proton conductivity of the PEM.

7 Claims, 1 Drawing Sheet

COMPOSITE PROTON EXCHANGE MEMBRANE

FIELD OF THE INVENTION

The present invention relates to fuel cells which generate electricity to power vehicles or other machinery. More particularly, the present invention relates to an organic/inorganic hybrid composite proton exchange membrane (PEM) having a solid inorganic conductor filler material which imparts high water retention capabilities to the membrane at high temperatures and enhances proton conductivity of the membrane.

BACKGROUND OF THE INVENTION

Proton exchange membranes (PEMs) are used in fuel cells to electrically insulate an anode from a cathode and to conduct protons from the anode to the cathode during fuel cell operation. PEMs usually include a polymer matrix having attached functional groups which are capable of exchanging cations. The polymer matrix is typically an organic polymer material such as polystyrene, polytetrafluoroethylene (PTFE) or polytetrafluoroethylene analogs, or perfluorosulfonic acid (PFSA). Sulfonic acid groups are incorporated into the polymer matrix.

It is important for the PEM to have certain properties for optimum functioning of a fuel cell. These properties include a high ionic and no electronic conductivity, low gas permeability, resistance to swelling and high mechanical strength. Therefore, various attempts have been made to improve one or multiple properties of a fuel cell PEM. For example, inorganic particles have been impregnated into PFSA using sol-gel chemistry in order to improve water retention of the PEM at temperatures higher than 100 degrees C. Solid inorganic proton conductors, such as zirconium phosphate, have been introduced into PFSA resin via methods such as ion exchange followed by precipitation. In addition to high-temperature water retention capability similar to that offered by silicon oxide, the solid inorganic proton conductors impart additional proton conductivity to the PEM.

Other methods for enhancing properties of a PEM include the use of porous inorganic glass ($SiO_2$—$P_2O_5$ made via sol-gel chemistry) as a high-temperature PEM. In that case, —P—OH groups bonded to the Si—O network provide the proton conduction mechanism. The inorganic glass is used as a bulk material rather than as a filler in a polymeric resin such as PFSA.

According to the present invention, an organic/inorganic hybrid composite proton exchange membrane includes a solid inorganic conductor which is used as filler in a PFSA resin. The solid inorganic conductor imparts enhanced water retention at high temperatures, as well as enhanced proton conductivity, to the PEM.

SUMMARY OF THE INVENTION

The present invention is generally directed to an organic/inorganic hybrid composite proton exchange membrane (PEM) which is suitable for use in a fuel cell. The PEM includes solid inorganic conductor ($SiO_2$—$P_2O_5$) particles which are used as filler in a perfluorosulfonic acid (PFSA) resin to impart enhanced water retention capabilities to the PEM at high temperatures as well as enhanced proton conductivity to the PEM. The solid inorganic conductor particles are formed in the PFSA resin by providing a filler-forming mixture of $Si(OEt)_4$ and $PO(OMe)_3$ (wherein "Et" and "Me" are ethyl and methyl groups, respectively) and immersing a PFSA membrane in the mixture. This step facilitates the infusion of the mixture into the micelles of the PFSA membrane resin. A post-treatment step is then carried out to convert the Si—OEt and P—OMe groups into Si—OH and P—OH, respectively, and cross-link these groups into inorganic solid conductor glass particles inside the micelles of the PFSA resin. The Si—OH and P—OH groups extend from the surface of each particle and facilitate water retention at high temperatures (>100 degrees C.). The —P—OH groups impart sufficient acidity to the resin to enhance proton conductivity of the PEM.

BRIEF DESCRIPTION OF THE DRAWINGS

The invention will now be described, by way of example, with reference to the accompanying drawings, in which.

DETAILED DESCRIPTION OF THE INVENTION

The present invention contemplates an organic/inorganic hybrid composite proton exchange membrane (PEM) which is characterized by enhanced water retention capabilities at high temperatures and enhanced proton conductivity during operation of a fuel cell. According to the invention, solid inorganic conductor particles, which are $SiO_2$—$P_2O_5$ glass particles, are formed as a filler material in a perfluorosulfonic acid (PFSA) resin membrane or non-PFSA ionomeric membrane by immersing the membrane in a filler-forming mixture including $Si(OEt)_4$ and $PO(OMe)_3$, wherein "Et" and "Me" are ethyl and methyl groups, respectively. Immersion of the membrane in the filler-forming mixture facilitates infusion of the mixture into the membrane resin. A post-treatment step is then carried out to convert the Si—OEt and P—OMe groups in the resin into Si—OH and P—OH, respectively. This step cross-links the Si—OH and P—OH groups and forms the inorganic solid conductor glass particles in the membrane resin.

Figure 1:
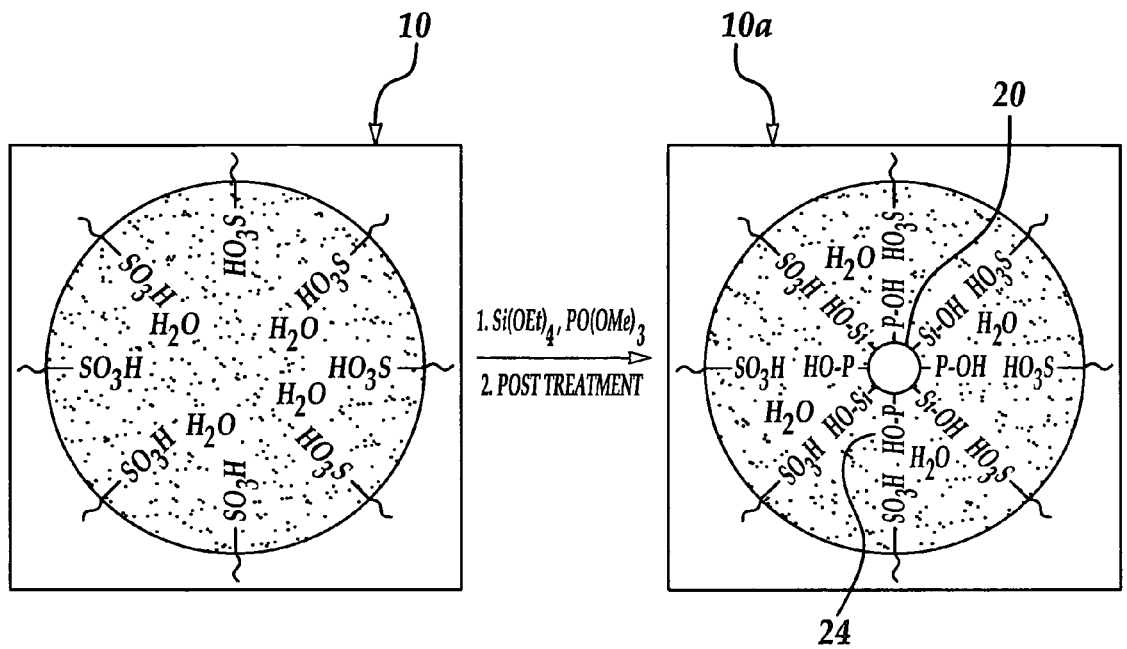
FIG. 1 is a schematic diagram illustrating a typical chemical reaction in which inorganic solid conductor glass particles are formed in micelles of a PFSA resin according to the present invention.

Referring to FIG. 1, a portion of a PFSA (perfluorosulfonic acid) membrane 10 having a hydrophobic non-ionic region and micelles is shown. While the invention will be described herein with respect to PFSA membranes, it is understood that the invention is equally applicable to non-PFSA ionomeric membranes such as hydrocarbon membranes, for example. The PFSA membrane 10 has a reverse-micelle structure which contains a hydrophilic interior environment excluded from an outer hydrophobic non-ionic region. Hydrophilic sulfonic acid groups (—$SO_3H$) extend from the PFSA molecules into the hydrophilic interior of each micelle.

Figure 2:
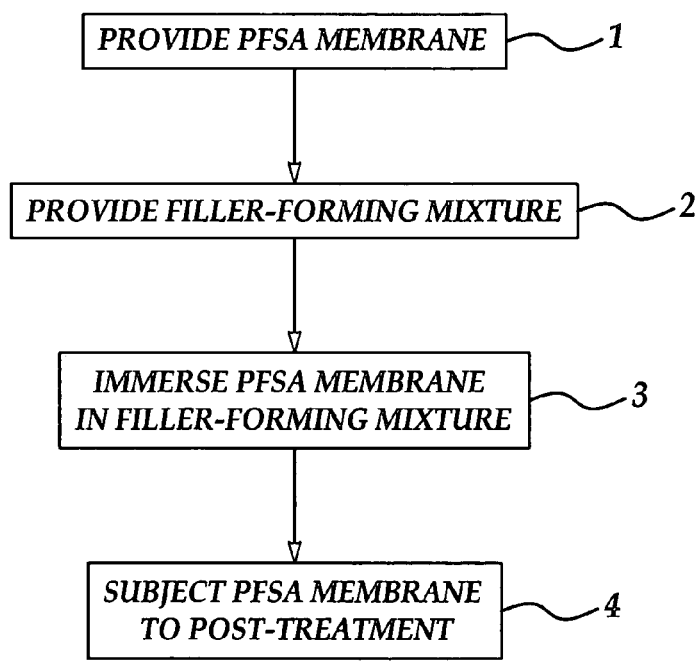
FIG. 2 is a flow diagram which summarizes sequential process steps carried out according to a method of fabricating a composite proton exchange membrane according to the present invention.

Referring to FIGS. 1 and 2, according to the present invention, a PFSA membrane 10 is initially provided, as indicated in step 1, and a filler-forming mixture, which is an aqueous mixture of $Si(OEt)_4$ and $PO(OMe)_3$, is provided, as indicated in step 2. In the filler-forming mixture, "Et" is an ethyl group and "Me" is a methyl group. The preferred formulation of the filler-forming mixture is 25/0.5/1 [$Si(Oet)_4$]/$PO(OMe)_3$/methanol in volume ratio. PFSA membrane is first immersed in a methanol/water (2/1 volume ratio) mixture for five minutes. Then, as indicated in step 3, the PFSA membrane 10 is immersed in the liquid filler-forming mixture. The reaction occurs at room temperature. Accordingly, inside each micelle, a hydrolysis sol-gel reaction involving water and the —$SO_3H$ groups (catalyst) occurs to yield an inorganic solid conductor glass $SiO_2$—$P_2O_5$ particle 20 in each micelle, as shown in FIG. 1.

As indicated in step 4 of FIG. 2, the PFSA membrane is subjected to a post-treatment process to convert the Si—OEt and P—OMe groups of the filler-forming mixture into Si—OH and P—OH groups, respectively, and cross-link the groups to form the glass particle 20. The post-treatment including cross-linking occurs when the treated membrane is kept in a fully-humidified chamber at elevated temperature (for instance, 90 degrees C.) for a few hours (5 hours, for example). The result is a modified PFSA membrane 10a having an inorganic solid conductor glass particle 20 in the hydrophilic interior of each micelle, with Si—OH and P—OH groups extending from the surface of the particle 20. The Si—OH and P—OH groups on the surface of the particle 20 enhance retention of water molecules in the micelles at high temperatures (>100 degrees C.) which are characteristic of fuel cell operation. Furthermore, the P—OH groups impart sufficient acidity to the particles 20 to enhance proton conductivity of the modified PFSA membrane 10a.

While the preferred embodiments of the invention have been described above, it will be recognized and understood that various modifications can be made in the invention and the appended claims are intended to cover all such modifications which may fall within the spirit and scope of the invention.

What is claimed is:

1. A method of forming an organic/inorganic composite proton exchange membrane, comprising:
   providing a proton exchange membrane;
   providing a filler-forming liquid; and
   forming particulate inorganic conductor filler material in said proton exchange membrane by immersing said proton exchange membrane in said filler-forming liquid, and wherein said particulate inorganic conductor filler material comprises $SiO_2$—$P_2O_5$ particles.

2. The method of claim 1 wherein said proton exchange membrane comprises a perfluorosulfonic acid resin membrane or a hydrocarbon membrane.

3. The method of claim 1 further comprising a plurality of —SiOH and —POH groups provided on said particles.

4. The method of claim 1 wherein said proton exchange membrane comprises a perfluorosulfonic acid resin membrane or a hydrocarbon membrane and wherein said particulate inorganic conductor filler material comprises $SiO_2$—$P_2O_5$ particles.

5. A method of forming an organic/inorganic composite proton exchange membrane, comprising:
   providing a proton exchange membrane comprising inverse micelles and non-ionic regions;
   providing a filler-forming mixture comprising $Si(OEt)_4$ and $PO(OMe)_3$, wherein Et is an ethyl group and Me is a methyl group; and
   forming particulate inorganic conductor filler material comprising $SiO_2$—$P_2O_5$ particles in said inverse micelles of said proton exchange membrane by immersing said proton exchange membrane in said filler-forming mixture.

6. The method of claim 5 wherein said proton exchange membrane comprises a perfluorosulfonic acid resin membrane or a hydrocarbon membrane.

7. The method of claim 6 further comprising a plurality of —SiOH and —POH groups provided on said particles.

* * * * *